(12) United States Patent
Garg et al.

(10) Patent No.: US 11,593,675 B1
(45) Date of Patent: Feb. 28, 2023

(54) MACHINE LEARNING-BASED PROGRAM ANALYSIS USING SYNTHETICALLY GENERATED LABELED DATA

(71) Applicant: Amazon Technologies, Inc., Seattle, WA (US)

(72) Inventors: Pranav Garg, Jersey City, NJ (US); Srinivasan Sengamedu Hanumantha Rao, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 591 days.

(21) Appl. No.: 16/699,378

(22) Filed: Nov. 29, 2019

(51) Int. Cl.
*G06F 21/57* (2013.01)
*G06N 20/00* (2019.01)
*G06N 5/04* (2006.01)
*G06F 8/75* (2018.01)

(52) U.S. Cl.
CPC .............. *G06N 5/04* (2013.01); *G06F 8/75* (2013.01); *G06F 21/577* (2013.01); *G06N 20/00* (2019.01)

(58) Field of Classification Search
CPC ............ G06N 5/04; G06N 20/00; G06F 8/75; G06F 21/577
See application file for complete search history.

(56) References Cited

U.S. PATENT DOCUMENTS

| | | | |
|---|---|---|---|
| 7,418,354 B1 * | 8/2008 | Greenlee | G01M 3/2807 73/40.5 R |
| 7,991,961 B1 * | 8/2011 | Tsai | G06F 11/0751 714/48 |
| 10,949,338 B1 * | 3/2021 | Sirianni | G06N 20/20 |
| 2017/0212829 A1 * | 7/2017 | Bales | G06F 11/3612 |
| 2018/0276562 A1 * | 9/2018 | Woulfe | G06N 3/0445 |
| 2021/0149788 A1 * | 5/2021 | Downie | G06F 11/3604 |

OTHER PUBLICATIONS

"Deep Learning to Find Bugs", Technical ReportTUD-CS-2017-0295, Michael Pradel etal (Year: 2017).*

* cited by examiner

*Primary Examiner* — Daxin Wu
(74) *Attorney, Agent, or Firm* — Nicholson De Vos Webster & Elliott LLP

(57) ABSTRACT

Techniques for performing machine learning-based program analysis using synthetically generated labeled data are described. A method of performing machine learning-based program analysis using synthetically generated labeled data may include receiving a request to perform program analysis on code, determining a first portion of the code associated with a first error type, sending the first portion of the code to an endpoint of a machine learning service associated with an error detection model to detect the first error type, the error detection model trained using synthetically generated labeled data, and receiving inference results from the error detection model identifying one or more errors of the first error type in the first portion of the code.

20 Claims, 9 Drawing Sheets

MACHINE LEARNING-BASED PROGRAM ANALYSIS USING SYNTHETICALLY GENERATED LABELED DATA

BACKGROUND

The field of machine learning has become widely acknowledged as a likely significant driver of the future of technology. Organizations everywhere now seek to use machine learning techniques to address a wide variety of problems, such as optimizing aspects of their products, processes, customer experience, etc. Program analysis includes techniques to automatically analyze computer programs to identify bugs (e.g., errors in the code) and/or other features of the code. Program analysis may be used to identify and correct bugs, improve code performance, etc. before the code is released. Program analysis may include static program analysis in which the code is analyzed without being executed, and/or dynamic program analysis which is performed during runtime.

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for performing machine learning-based program analysis using synthetically generated labeled data. Program analysis may be used to identify bugs (e.g., errors) in code before the code is released. However, often the entire program code is not available for analysis. For example, program code written by a developer may rely on code from external sources, such as library functions or other code written by a third party, or code written in a different language from the languages supported by the program analysis service. Additionally, program analysis typically only accesses executable code, and does not factor in non-executable sources of information, such as comments in the code, variable names, method names, etc. As a result, program analysis is inherently imprecise, as there are portions of the program which the program analysis service cannot analyze.

According to some embodiments, program analysis can use machine learning to improve the accuracy of the program analysis. Machine learning can be used to learn and identify common inaccuracies introduced by program analyses from publicly available source code repositories and privately available source code. The main challenge in using machine learning to improve program analysis is a lack of labeled data. Source code available in public repositories includes both correct and buggy code, however their labels are not known. To address this problem, the results of the program analysis can be used to synthetically generate labeled data. Program analyses are typically sound, i.e., when the program analysis determines a program is correct, the program is actually correct with a high likelihood; but when the program analysis determines a program is incorrect, the program analysis might be returning a false positive. As such, the code determined by the program analysis to be correct can be used to synthetically generate labeled data to train machine learning models for use in program analysis.

Figure 1:
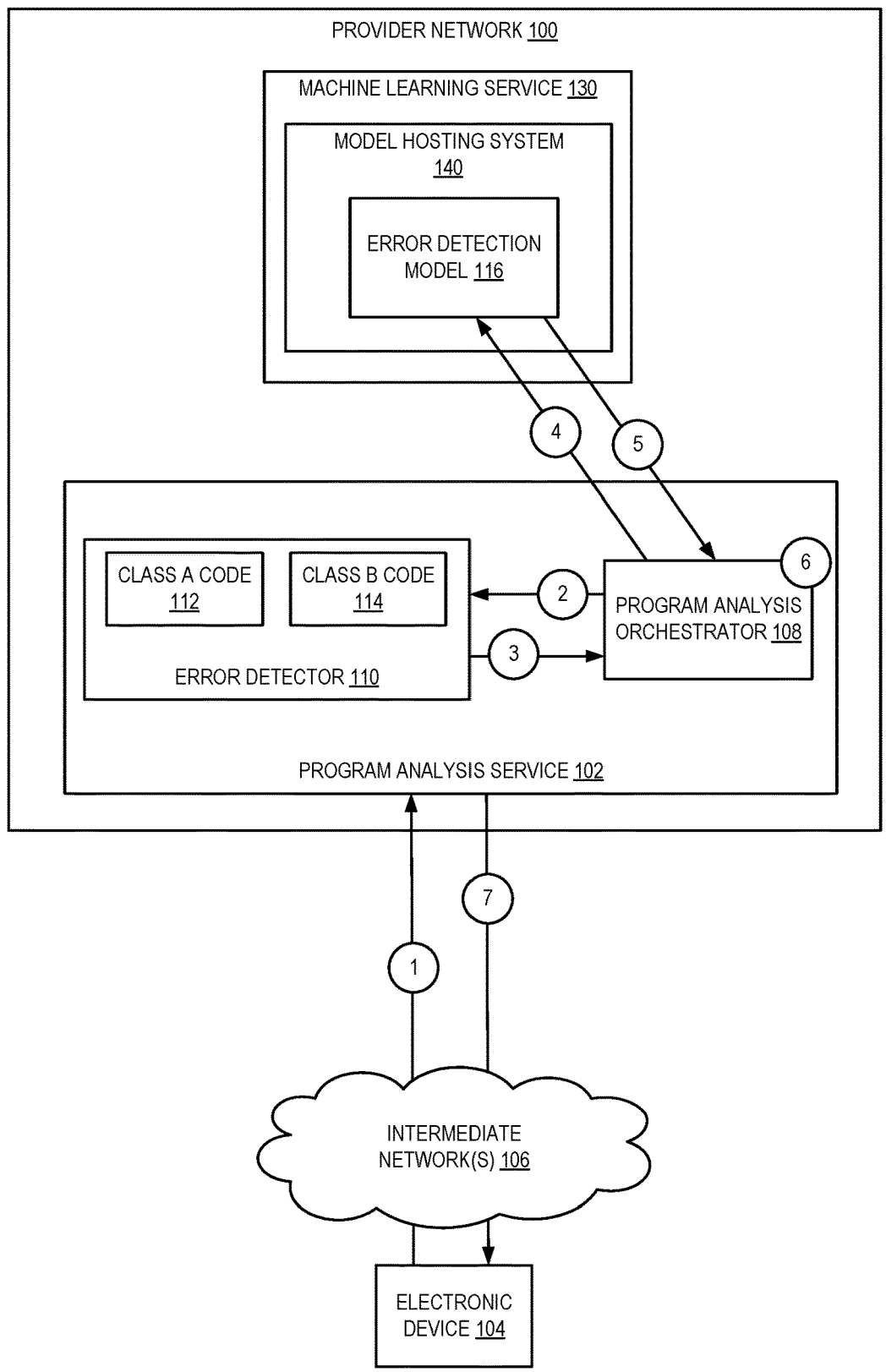
FIG. 1 is a diagram illustrating an environment for performing machine learning-based program analysis using synthetically generated labeled data according to some embodiments.

FIG. 1 is a diagram illustrating an environment for performing machine learning-based program analysis using synthetically generated labeled data according to some embodiments. As shown in FIG. 1, a provider network 100 may include a program analysis service 102 and a machine learning service 130. The program analysis service 102 may receive requests from customers to perform program analysis on their code. For example, at numeral 1, a customer using electronic device 104 can send a request over one or more intermediate networks 106 to program analysis service 102 to analyze code. The code may be submitted with the request or the request may include a reference to a repository where the code is stored. The repository may be hosted in provider network 100 or may be external to provider network 100. In some embodiments, customers of program analysis service 102 may be internal to provider network 100 and may include users and/or services of provider network 100 which may submit code for analysis prior to being deployed.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

When the request is received by the program analysis service 102, a program analysis orchestrator 108 can send the code to be analyzed to error detector 110. Error detector 110 may be configured to identify one or more different error types. This may include various omission errors which are introduced due to omission of certain statements in the code. For example, omission errors may include resource leaks cause by failing to close out resources once they are no longer in use, omission of certain validations (e.g., checking whether a value is null which might lead to a null pointer exception), or omission of exception handlers. The error detector 110 can divide the code under analysis into class A code 112 and class B code 114. The class A code is determined by the error detector to be correct (e.g., this code does not include the errors for which the error detector is configured to identify). The class B code is determined to include errors. As discussed, due to the imprecise nature of typical program analysis, class B code likely includes false positives (e.g., correct code that has been incorrectly identified as including one or more errors) as well as true positives (e.g., code that does actually include errors). At numeral 3, error detector 110 can return the now identified class A code and class B code to the program analysis orchestrator.

At numeral 4, the program analysis orchestrator 108 can send the class B code 114 to an error detection model 116 for further analysis. As shown in FIG. 1, the error detection model can be hosted by a model hosting system 140 of a machine learning service 130. The error detection model may be associated with an endpoint (such as an HTTP endpoint) to which the class B code can be sent. The error detection model may be trained to identify a particular type of error in the code. As discussed, the error detection model may be trained using synthetically generated labeled data based on the results of program analysis of available code bases. When the error detection model 116 receives the class B code, it can perform inference on the class B code. The error detection model can return a confidence score for all or portions of the class B code. For example, if the error detection model has been trained to identify resource leaks, then the error detection model can return a confidence score indicating the likelihood that the class B code includes a resource leak. In some embodiments, a confidence score may be returned for each resource invoked in the class B code, indicating the likelihood that that resource is associated with a resource leak. At numeral 5, the program orchestrator can receive the inference results from the error detection model. If the inference results indicate that the class B code includes one or more errors, then at numeral 6, the program orchestrator can highlight portions of the class B code that are likely to be associated with the one or more errors. In some embodiments, a portion of the class B code may be determined to include an error if it is associated with a confidence score greater than a threshold value. This may effectively divide the class B code include class C code and class D code, where the class C code is the portion of class B code that does not include errors, and class D code is the portion of class B code that is likely to include errors, based on the inference performed by the error detection model. For example, in the resource leak use case, the one or more portions of the code that are associated with possible resource leaks may be highlighted (e.g., the one or more lines of code where a resource is created that the model has identified as likely not being closed). At numeral 7, the results of the program analysis, including the errors identified by the error detection model, can be returned to the customer.

Embodiments are described with respect to identifying resource leaks in code using machine learning-based program analysis, however other errors in code may be identified using similar techniques. As discussed, these other errors may include omission errors which are introduced due to omission of certain statements in the code. For example, such an error could be due to an omission of certain validations, like checking whether a value is null which might lead to a null pointer exception. Other omission errors may include failing to include appropriate exception handlers.

Figure 2:
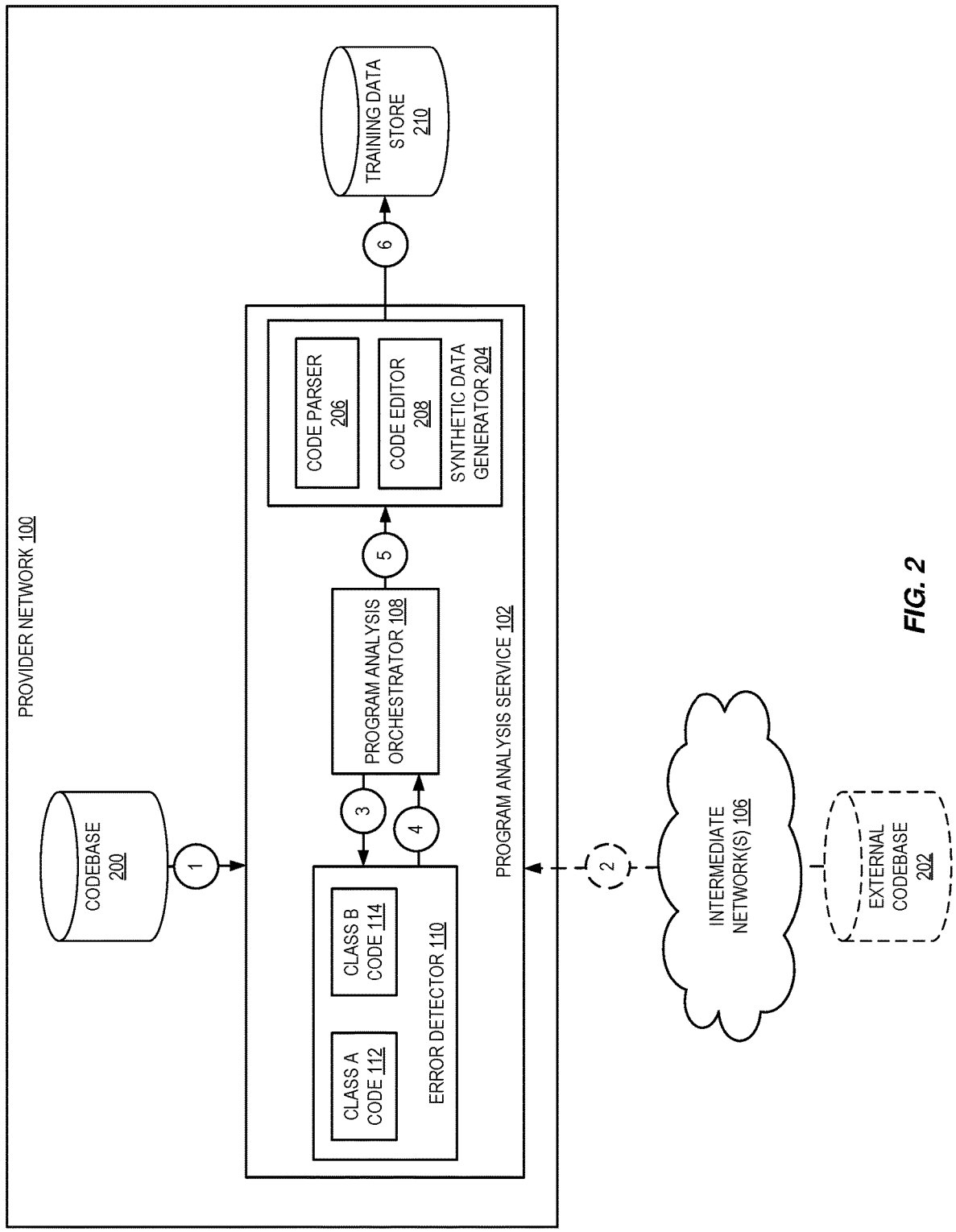
FIG. 2 is a diagram illustrating an environment for generating synthetic labeled data according to some embodiments.

FIG. 2 is a diagram illustrating an environment for generating synthetic labeled data according to some embodiments. As discussed, a challenge in implementing a machine learning-based program analysis service is in obtaining training data to train the error detection model. Embodiments use the results of non-machine learning-based program analysis to synthetically generate the training data. At numeral 1, code from a codebase 200 may be obtained by program analysis service 102. This may include code available to provider network 100, such as code for other service provided by provider network 100, customer code which the provider network has permission to use for such analysis, etc. In some embodiments, the program analysis service 102 may additionally, or alternatively, obtain one from one or more external repositories, such as external codebase 202, as shown at numeral 2. The external code repositories may include publicly available code repositories.

At numeral 3, the program analysis orchestrator 108 can pass all or portions of the code obtained from the codebase 200 and/or external codebase 202 to the error detector 110. At numeral 4, the error detector can return the class A code 112 and class B code 114 to the program analysis orchestrator 108. The code in class A code 112 includes code that has been determined by the error detector 110 to be correct (e.g., it does not include the types of errors for which error detector 110 has been configured to check). The class A code can be sent from the program analysis orchestrator 108 to a synthetic data generator 204 at numeral 5. Although the embodiment shown in FIG. 2 shows the synthetic data generator 204 as part of the program analysis service 102, in some embodiments, the synthetic data generator may be a separate service provided by the provider network 100.

Synthetic data generator 204 can mutate the class A code from code that is known to be correct based on the analysis of error detector 110, into code that is known to include errors, due to the mutations. Synthetic data generator 204 can include a code parser 206 which may identify one or more patterns associated with a particular type of error. For example, the code parser can identify an open resource call in the code and a corresponding close resource call in the code. The corresponding close call may be an explicit close method, a "try" code block that closes the resource, a "finally" code block that closes the resource, a close function that occurs on exit of the method, etc. Other error patterns may correspond to different error types and may be similarly used to obtain training data to train a model for one of the other error types. The code parser may identify these patterns each time they occur in the code (e.g., for each resource that is invoked by the code). Each of these identified patterns can then be mutated by code editor 208, which may remove or change the pattern to introduce the desired error. For example, to cause resource leaks, the code editor may remove the calls that close resources, to introduce null pointer exceptions, the code editor may remove portions of code that validate values are not null, to introduce other exceptions, the code editor may remove exception handlers, etc. The resulting synthetically generated code that is known to include a particular type of error may then be stored in training data store 210 at numeral 6. In some embodiments, the incorrect portion of the code (e.g., the portion of the code determined by the error detector to include one or more errors of the error type) may also be stored in the training data store to be used for training the error detection model.

Figure 3:
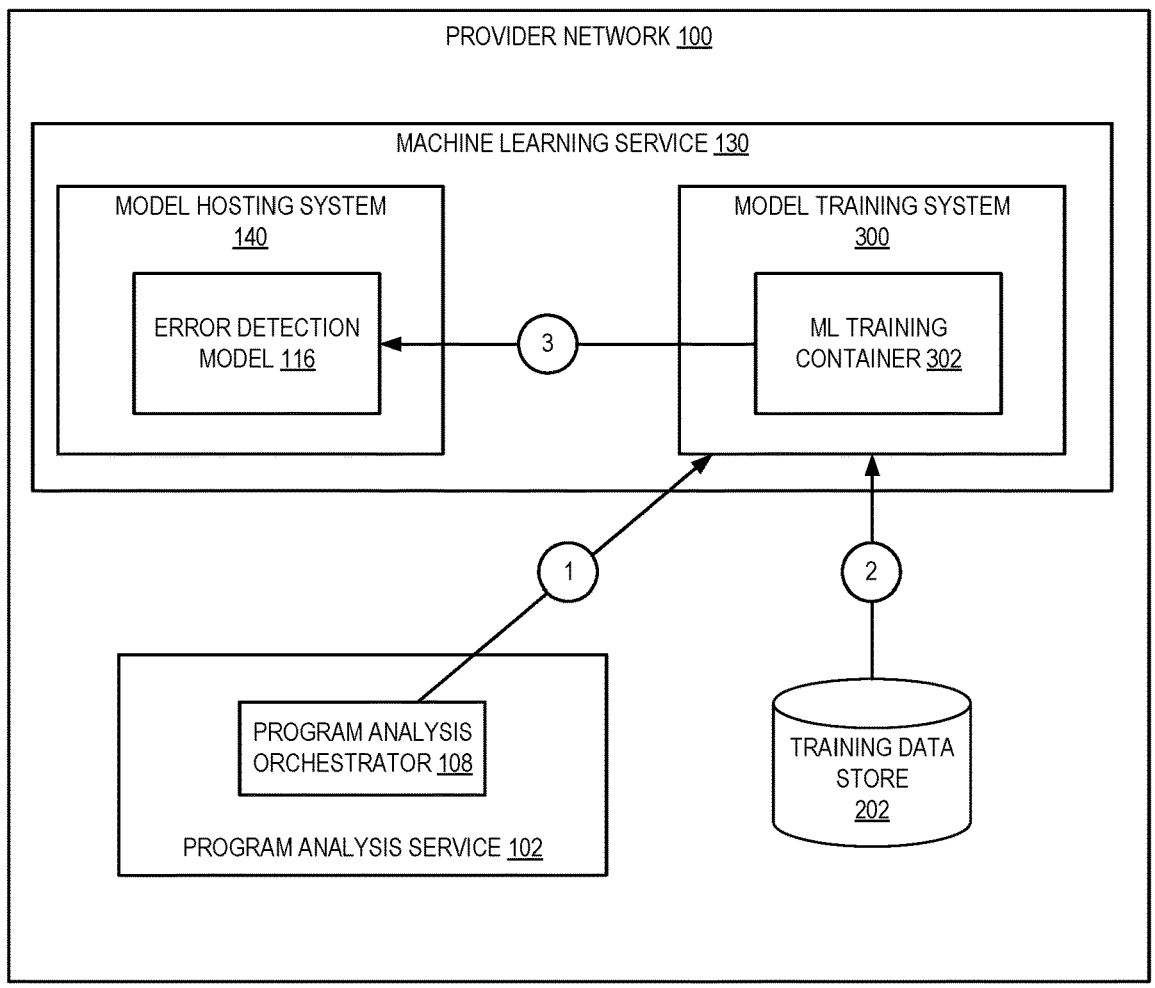
FIG. 3 is a diagram illustrating an environment for training a machine learning model for use in program analysis using synthetically generated labeled data according to some embodiments.

FIG. 3 is a diagram illustrating an environment for training a machine learning model for use in program analysis using synthetically generated labeled data according to some embodiments. As shown in FIG. 3, the program analysis orchestrator can send a message at numeral 1 to a model training system 300 of machine learning service indicating that training data is available to train a new model. The training data store 202 may include the synthetically generated data described above and, in some embodiments, may also include the class B code that was identified as including one or more errors. In some embodiments, the message may include an identifier associated with the training data store 202 and or the synthetically generated training dataset stored in the training data store, such as a URL, URI, or other identifier. At numeral 2, the model training system 300 can retrieve the synthetically generated data from the training data store.

The model training system 300 may include an ML training container 302 which includes an algorithm to train the error detection model. The ML training container can extract features from (e.g., featurize) the synthetically generated training data and then train the error detection model using the features. In some embodiments, these features may include application programming interface (API) calls to external functions, method names, class names, and other features of the synthetically generated code. In some embodiments, the ML training container 302 may implement algorithms associated with positive unlabeled learning, which use the synthetically generated data (the positively labeled data) and the class B code (the unlabeled data) to train the error detection model. In some embodiments, the ML training container may implement algorithms associated with supervised learning, where the synthetically generated data is the positively labeled data and the class B code is the negatively labeled data, for the purposes of training. Once training is complete, the model training system can output the error detection model to an endpoint of model hosting system 140 for use in inference, at numeral 3.

Figure 4:
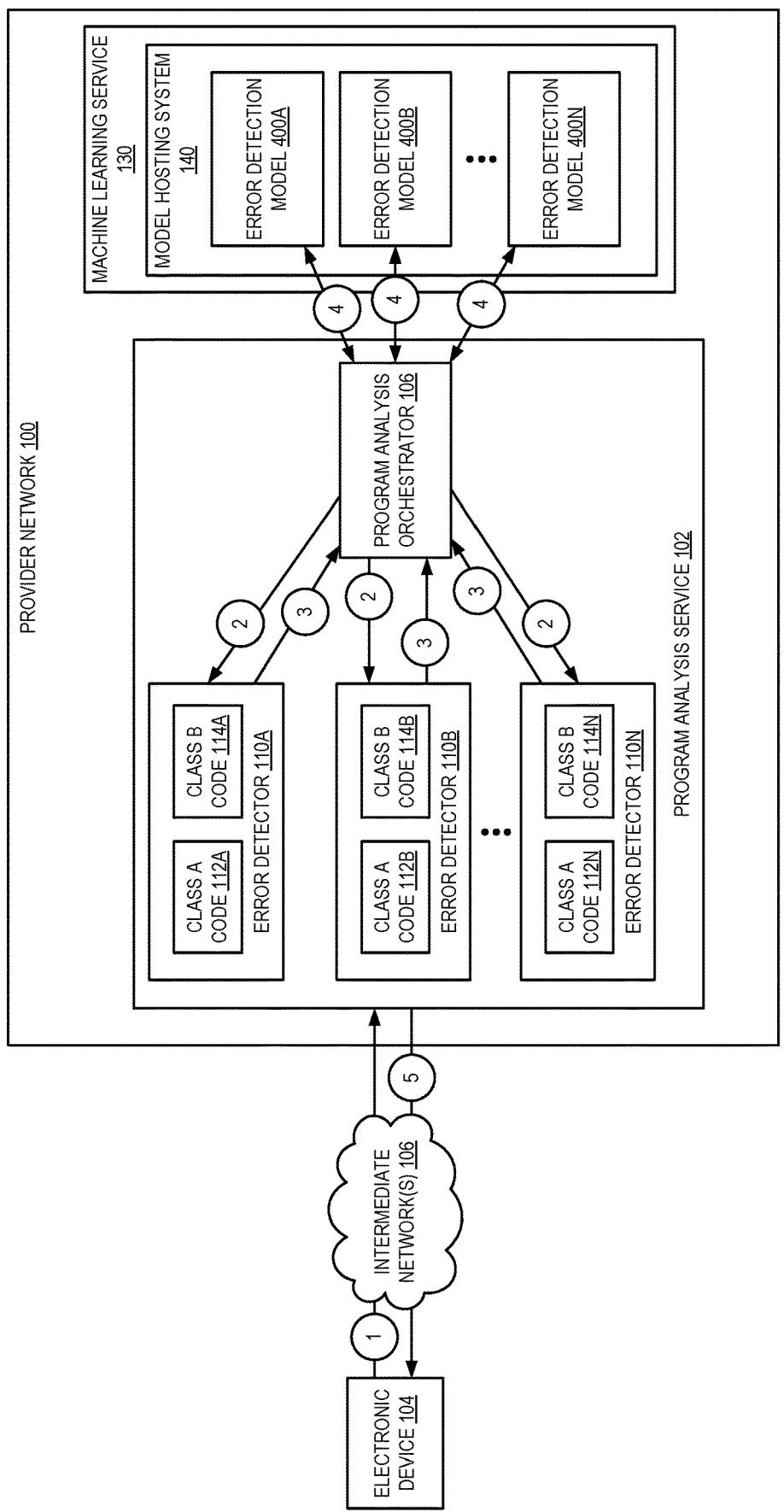
FIG. 4 is a diagram illustrating an environment for performing machine-learning based program analysis to identify multiple types of bugs in the code being analyzed according to some embodiments.

FIG. 4 is a diagram illustrating an environment for performing machine-learning based program analysis to identify multiple types of bugs in the code being analyzed according to some embodiments. As discussed above, an error detection model may be trained to detect a particular error type in customer code. In some embodiments, the program analysis service 102 may be configured to detect multiple error types and may send code to be processed by multiple error detection models 400A-400N for different error types. These error detection models may each correspond to a different error detector 110A-110N, which are each configured to perform traditional program analysis to detect a different error type. Like the error detector 110 discussed above, each error detector 110A-110N may identify a correct portion of the code, class A code 112A-112N, which does not include the error type being detected by a particular error detector, and incorrect code, class B code 114A-114N which is determined to include one or more errors of the error type that error detector is configured to detect. Similar to the embodiment shown in FIG. 1, a request may be sent to the program analysis service 102 to analyze code from a customer, at numeral 1. At numeral 2, the program analysis orchestrator can send the code to be analyzed by error detectors 110A-110N, which may identify class A code 112A-112N, which is determined to be correct, and class B code 114A-114N, which is determined to include errors (e.g., incorrect code). The program orchestrator 106 can receive the class B code 114A-114N at numeral 3 and then send copies of the class B code in parallel to the corresponding error detection models 400A-400N at numeral 4. Each model may return its results to the program orchestrator and, once all of the models have returned their results, the program analysis orchestrator can merge the results. The merged results may include highlighted portions of code corresponding to each error that was determined to likely exist based on the confidence scores returned by the error detection models. The merged results can then be returned to the customer at numeral 5.

Figure 5:
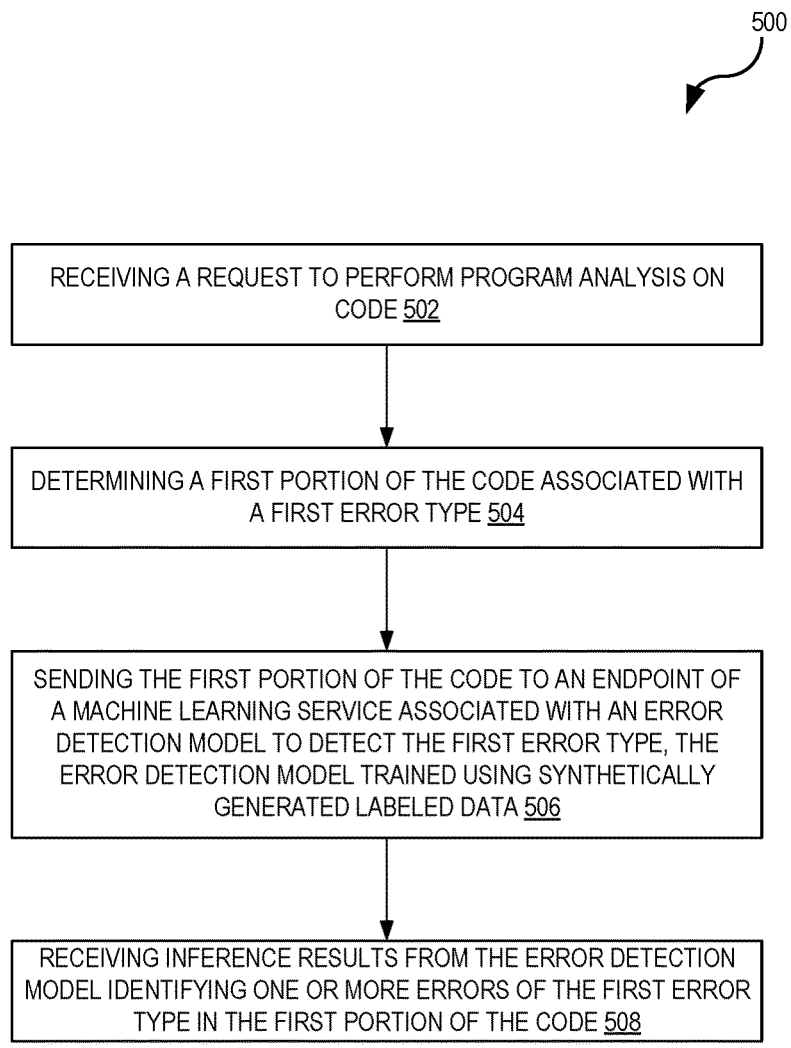
FIG. 5 is a flow diagram illustrating operations of a method for performing machine learning-based program analysis using synthetically generated labeled data according to some embodiments.

FIG. 5 is a flow diagram illustrating operations of a method for performing machine learning-based program analysis using synthetically generated labeled data according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by program analysis service 102 or machine learning service 130 of the other figures.

The operations 500 include, at block 502, receiving a request to perform program analysis on code. In some embodiments, the request may include the code to be analyzed or may include a reference to a storage location in which the code to be analyzed is stored.

The operations 500 further include, at block 504, determining a first portion of the code associated with a first error type. As discussed, the program analysis may identify correct code (e.g., code that is determined not to include the error type being checked for) and code that includes one or more errors of the error type. The error code may be overinclusive, and therefore may include both true positives (actual errors) and false positives (not actual errors).

The operations 500 further include, at block 506, sending the first portion of the code to an endpoint of a machine learning service associated with an error detection model to detect the first error type, the error detection model trained using synthetically generated labeled data. As discussed, by sending the first portion of the code to be analyzed by the machine learning model, the false positives and true positives in the first portion of the code can be identified, improving the accuracy of the program analysis In some embodiments, the operations may further include obtaining training code from one or more code repositories, determining a correct portion of the training code, generating training data by mutating the correct portion of the training code to include a plurality of errors of the first error type, and storing the training data in a training data store.

In some embodiments, generating training data by mutating the correct portion of the training code to include a plurality of errors of the first error type, may further include identifying a pattern in the correct portion of the training code associated with the first error type, the pattern occurring in a plurality of locations in the correct portion of the training code, and generating the synthetically generated labeled data by deleting a portion of code corresponding to a portion of the pattern in the plurality of locations in the correct portion of the training code.

The operations 500 further include, at block 508, receiving inference results from the error detection model identifying one or more errors of the first error type in the first portion of the code. In some embodiments, the inference results may include a confidence score for each potential error identified in the first portion of the code. If the confidence score is greater than a threshold value, the corresponding potential error is identified as an error of the first error type.

In some embodiments, the operations may further include sending a request to the machine learning service to train the error detection model using the training data, wherein the machine learning service obtains the training data from the training data store and trains the error detection model using the training data and a machine learning training algorithm. In some embodiments, the machine learning training algorithm includes a positive unlabeled learning algorithm or a supervised learning algorithm. In some embodiments, upon training the error detection model, the machine learning service stores the error detection model to the endpoint of the machine learning service.

In some embodiments, the operations may further include sending the first portion of the code to a plurality of endpoints of the machine learning service in parallel, each endpoint associated with a different error detection model to detect a plurality of error types, each error detection model trained using synthetically generated labeled data. In some embodiments, the operations may further include returning program analysis results, the program analysis results including highlighted portions of the code corresponding to the one or more errors of the first error type. In some embodiments, the first error type corresponds to a resource leak.

In some embodiments, the operations 500 may include obtaining training code from one or more public code repositories, determining a correct portion of the training code based at least on a program analysis, the correct portion of the training code associated with no errors detected by the program analysis, identifying a pattern in the correct portion of the training code associated with a resource leak, the pattern occurring in a plurality of locations in the correct portion of the training code, synthetically generating labeled data by deleting close resource calls in the plurality of locations in the correct portion of the training code, and sending a request to a machine learning service to train a resource leak detection model using at least the synthetically generated labeled data and an incorrect portion of the training code, the incorrect portion of the training code identified as including one or more errors by the program analysis, wherein the machine learning service stores the trained resource leak detection model to an endpoint of the machine learning service.

In some embodiments, the operations may further include receiving a request to perform program analysis on customer code, determining a first portion of the customer code includes one or more resource leaks, sending the first portion of the customer code to the endpoint of the machine learning service, and receiving inference results from the resource leak detection model identifying one or more resource leaks in the first portion of the code. In some embodiments, the operations may further include returning program analysis results to the customer, the program analysis results including highlighted portions of the customer code corresponding to the one or more resource leaks.

Figure 6:
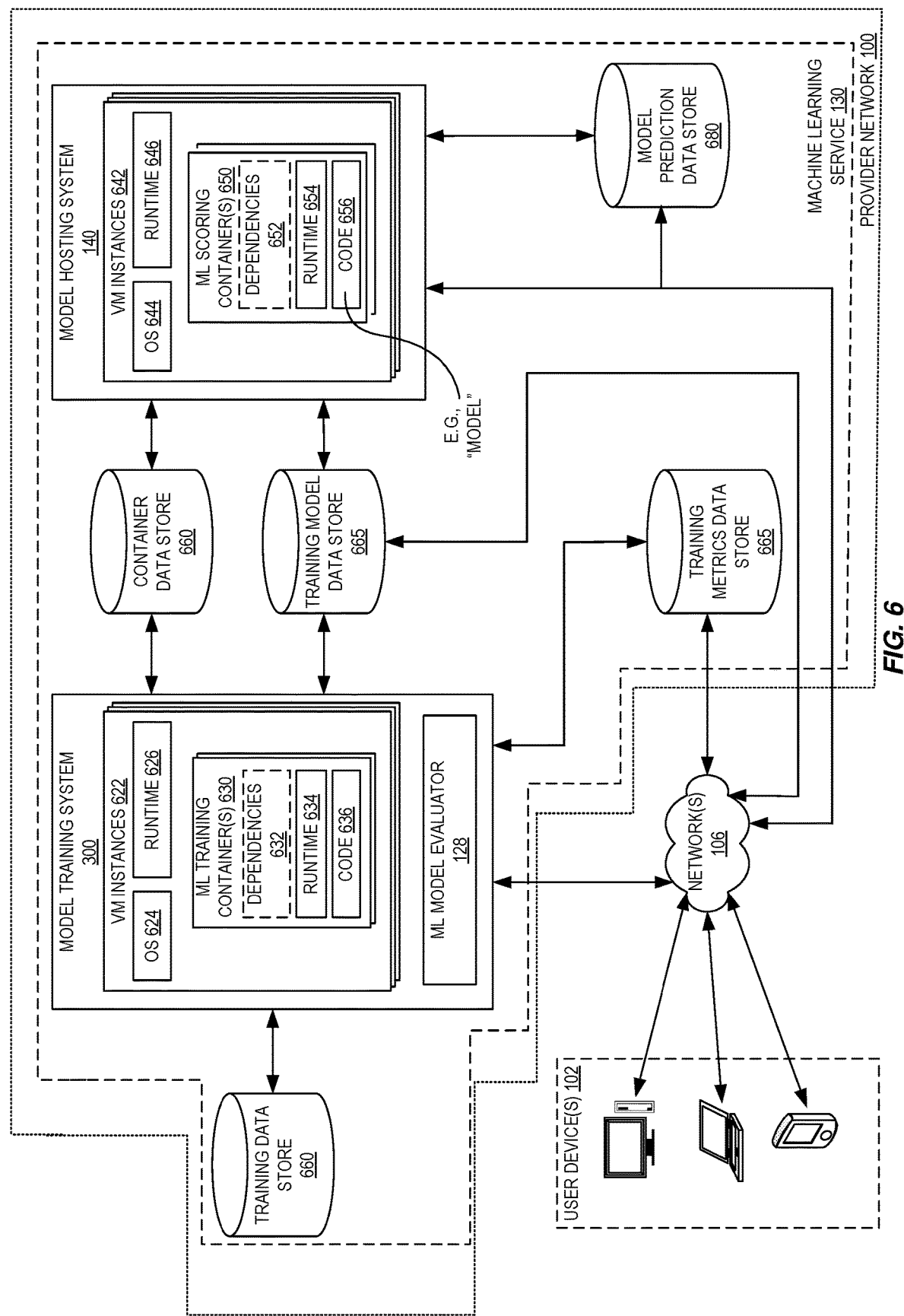
FIG. 6 is a block diagram of an illustrative operating environment in which machine learning models are trained and hosted according to some embodiments.

FIG. 6 is a block diagram of an illustrative operating environment in which machine learning models are trained and hosted according to some embodiments. The operating environment includes end user devices 102, a model training system 300, a model hosting system 140, a training data store 660, a training metrics data store 665, a container data store 670, a training model data store 675, and a model prediction data store 680.

A machine learning service 130 described herein may include one or more of these entities, such as the model hosting system 140, model training system 300, and so forth.

In some embodiments, users, by way of user devices 602, interact with the model training system 300 to provide data that causes the model training system 300 to train one or more machine learning models, for example, as described elsewhere herein. A machine learning model, generally, may be thought of as one or more equations that are "trained" using a set of data. In some embodiments, the model training system 300 provides ML functionalities as a web service, and thus messaging between user devices 602 and the model training system 300 (or provider network 100), and/or between components of the model training system 300 (or provider network 100), can use HTTP messages to transfer data in a machine-readable file format, such as eXtensible Markup Language (XML) or JavaScript Object Notation (JSON). In some embodiments, providing access to various functionality as a web service is not limited to communications exchanged via the World Wide Web and more generally refers to a service that can communicate with other electronic devices via a computer network.

The user devices 602 can interact with the model training system 300 via frontend 629 of the model training system 300. For example, a user device 602 can provide a training request to the frontend 629 that includes a container image (or multiple container images, or an identifier of one or multiple locations where container images are stored), an indicator of input data (for example, an address or location of input data), one or more hyperparameter values (for example, values indicating how the algorithm will operate, how many algorithms to run in parallel, how many clusters into which to separate data, and so forth), and/or information describing the computing machine on which to train a machine learning model (for example, a graphical processing unit (GPU) instance type, a central processing unit (CPU) instance type, an amount of memory to allocate, a type of virtual machine instance to use for training, and so forth).

In some embodiments, the container image can include one or more layers, where each layer represents an executable instruction. Some or all of the executable instructions together represent an algorithm that defines a machine learning model. The executable instructions (for example, the algorithm) can be written in any programming language (for example, Python, Ruby, C++, Java, etc.). In some embodiments, the algorithm is pre-generated and obtained by a user, via the user device 602, from an algorithm repository (for example, a network-accessible marketplace, a data store provided by a machine learning training service, etc.). In some embodiments, the algorithm is completely user-generated or partially user-generated (for example, user-provided code modifies or configures existing algorithmic code).

In some embodiments, instead of providing a container image (or identifier thereof) in the training request, the user device 602 may provide, in the training request, an algorithm written in any programming language. The model training system 300 then packages the algorithm into a container (optionally with other code, such as a "base" ML algorithm supplemented with user-provided code) that is eventually loaded into a virtual machine instance 622 for training a machine learning model, as described in greater detail below. For example, a user, via a user device 602, may develop an algorithm/code using an application (for example, an interactive web-based programming environment) and cause the algorithm/code to be provided—perhaps as part of a training request (or referenced in a training request)—to the model training system 300, where this algorithm/code may be containerized on its own or used together with an existing container having a machine learning framework, for example.

In some embodiments, instead of providing a container image in the training request, the user device 602 provides, in the training request, an indicator of a container image (for example, an indication of an address or a location at which a container image is stored). For example, the container image can be stored in a container data store 670, and this container image may have been previously created/uploaded by the user. The model training system 300 can retrieve the container image from the indicated location and create a container using the retrieved container image. The container is then loaded into a virtual machine instance 622 for training a machine learning model, as described in greater detail below.

The model training system 300 can use the information provided by the user device 602 to train a machine learning model in one or more pre-established virtual machine instances 622 in some embodiments. In particular, the model training system 300 includes a single physical computing device or multiple physical computing devices that are interconnected using one or more computing networks (not shown), where the physical computing device(s) host one or more virtual machine instances 622. The model training system 300 can handle the acquisition and configuration of compute capacity (for example, containers, instances, etc., which are described in greater detail below) based on the information describing the computing machine on which to train a machine learning model provided by the user device 602. The model training system 300 can then train machine learning models using the compute capacity, as is described in greater detail below. The model training system 300 can automatically scale up and down based on the volume of training requests received from user devices 602 via frontend 629, thereby relieving the user from the burden of having to worry about over-utilization (for example, acquiring too little computing resources and suffering performance issues) or under-utilization (for example, acquiring more computing resources than necessary to train the machine learning models, and thus overpaying).

In some embodiments, the virtual machine instances 622 are utilized to execute tasks. For example, such tasks can include training a machine learning model. As shown in FIG. 6, each virtual machine instance 622 includes an operating system (OS) 624, a language runtime 626, and one or more ML training containers 630. Generally, the ML training containers 630 are logical units created within a virtual machine instance using the resources available on that instance and can be utilized to isolate execution of a task from other processes (for example, task executions) occurring in the instance. In some embodiments, the ML training containers 630 are formed from one or more container images and a top container layer. Each container image may further include one or more image layers, where each image layer represents an executable instruction. As described above, some or all of the executable instructions together represent an algorithm that defines a machine learning model. Changes made to the ML training containers 630 (for example, creation of new files, modification of existing files, deletion of files, etc.) are stored in the top container layer. If a ML training container 630 is deleted, the top container layer is also deleted. However, the container image(s) that form a portion of the deleted ML training container 630 can remain unchanged. The ML training containers 630 can be implemented, for example, as Linux containers (LXC), Docker containers, and the like.

The ML training containers 630 may include individual a runtime 634, code 637, and dependencies 632 needed by the code 637 in some embodiments. The runtime 634 can be defined by one or more executable instructions that form at least a portion of a container image that is used to form the ML training container 630 (for example, the executable instruction(s) in the container image that define the operating system and/or runtime to run in the container formed from the container image). The code 637 includes one or more executable instructions that form at least a portion of a container image that is used to form the ML training container 630. For example, the code 637 includes the executable instructions in the container image that represent an algorithm that defines a machine learning model, which may reference (or utilize) code or libraries from dependencies 632. The runtime 634 is configured to execute the code 637 in response to an instruction to begin machine learning model training Execution of the code 637 results in the generation of model data, as described in greater detail below.

In some embodiments, the code 637 includes executable instructions that represent algorithms that define different machine learning models. For example, the code 637 includes one set of executable instructions that represent a first algorithm that defines a first machine learning model and a second set of executable instructions that represent a second algorithm that defines a second machine learning model. In some embodiments, the virtual machine instance 622 executes the code 637 and trains all of the machine learning models. In some embodiments, the virtual machine instance 622 executes the code 637, selecting one of the machine learning models to train. For example, the virtual machine instance 622 can identify a type of training data indicated by the training request and select a machine learning model to train (for example, execute the executable instructions that represent an algorithm that defines the selected machine learning model) that corresponds with the identified type of training data.

In some embodiments, the runtime 634 is the same as the runtime 626 utilized by the virtual machine instance 622. In some embodiments, the runtime 634 is different than the runtime 626 utilized by the virtual machine instance 622.

In some embodiments, the model training system 300 uses one or more container images included in a training request (or a container image retrieved from the container data store 670 in response to a received training request) to create and initialize a ML training container 630 in a virtual machine instance 622. For example, the model training system 300 creates a ML training container 630 that includes the container image(s) and/or a top container layer.

Prior to beginning the training process, in some embodiments, the model training system 300 retrieves training data from the location indicated in the training request. For example, the location indicated in the training request can be a location in the training data store 660. Thus, the model training system 300 retrieves the training data from the indicated location in the training data store 660. In some embodiments, the model training system 300 does not retrieve the training data prior to beginning the training process. Rather, the model training system 300 streams the training data from the indicated location during the training process. For example, the model training system 300 can initially retrieve a portion of the training data and provide the retrieved portion to the virtual machine instance 622 training the machine learning model. Once the virtual machine instance 622 has applied and used the retrieved portion or once the virtual machine instance 622 is about to use all of the retrieved portion (for example, a buffer storing the retrieved portion is nearly empty), then the model training system 300 can retrieve a second portion of the training data and provide the second retrieved portion to the virtual machine instance 622, and so on.

To perform the machine learning model training, the virtual machine instance 622 executes code 637 stored in the ML training container 630 in some embodiments. For example, the code 637 includes some or all of the executable instructions that form the container image of the ML training container 630 initialized therein. Thus, the virtual machine instance 622 executes some or all of the executable instructions that form the container image of the ML training container 630 initialized therein to train a machine learning model. The virtual machine instance 622 executes some or all of the executable instructions according to the hyperparameter values included in the training request. As an illustrative example, the virtual machine instance 622 trains a machine learning model by identifying values for certain parameters (for example, coefficients, weights, centroids, etc.). The identified values depend on hyperparameters that define how the training is performed. Thus, the virtual machine instance 622 can execute the executable instructions to initiate a machine learning model training process, where the training process is run using the hyperparameter values included in the training request. Execution of the executable instructions can include the virtual machine instance 622 applying the training data retrieved by the model training system 300 as input parameters to some or all of the instructions being executed.

In some embodiments, executing the executable instructions causes the virtual machine instance 622 (for example, the ML training container 630) to generate model data. For example, the ML training container 630 generates model data and stores the model data in a file system of the ML training container 630. The model data includes characteristics of the machine learning model being trained, such as a number of layers in the machine learning model, hyperparameters of the machine learning model, coefficients of the machine learning model, weights of the machine learning model, and/or the like. In particular, the generated model data includes values for the characteristics that define a machine learning model being trained. In some embodiments, executing the executable instructions causes a modification to the ML training container 630 such that the model data is written to the top container layer of the ML training container 630 and/or the container image(s) that forms a portion of the ML training container 630 is modified to include the model data.

The virtual machine instance 622 (or the model training system 300 itself) pulls the generated model data from the ML training container 630 and stores the generated model data in the training model data store 675 in an entry associated with the virtual machine instance 622 and/or the machine learning model being trained. In some embodiments, the virtual machine instance 622 generates a single file that includes model data and stores the single file in the training model data store 675. In some embodiments, the virtual machine instance 622 generates multiple files during the course of training a machine learning model, where each file includes model data. In some embodiments, each model data file includes the same or different model data information (for example, one file identifies the structure of an algorithm, another file includes a list of coefficients, etc.). The virtual machine instance 622 can package the multiple files into a single file once training is complete and store the single file in the training model data store 675. Alternatively, the virtual machine instance 622 stores the multiple files in the training model data store 675. The virtual machine instance 622 stores the file(s) in the training model data store 675 while the training process is ongoing and/or after the training process is complete.

In some embodiments, the virtual machine instance 622 regularly stores model data file(s) in the training model data store 675 as the training process is ongoing. Thus, model data file(s) can be stored in the training model data store 675 at different times during the training process. Each set of model data files corresponding to a particular time or each set of model data files present in the training model data store 675 as of a particular time could be checkpoints that represent different versions of a partially-trained machine learning model during different stages of the training process. Accordingly, before training is complete, a user, via the user device 602 can submit a deployment and/or execution request in a manner as described below to deploy and/or execute a version of a partially trained machine learning model (for example, a machine learning model trained as of a certain stage in the training process). A version of a partially-trained machine learning model can be based on some or all of the model data files stored in the training model data store 675.

In some embodiments, a virtual machine instance 622 executes code 637 stored in a plurality of ML training containers 630. For example, the algorithm included in the container image can be in a format that allows for the parallelization of the training process. Thus, the model training system 300 can create multiple copies of the container image provided in a training request and cause the virtual machine instance 622 to load each container image copy in a separate ML training container 630. The virtual machine instance 622 can then execute, in parallel, the code 637 stored in the ML training containers 630. The virtual machine instance 622 can further provide configuration information to each ML training container 630 (for example, information indicating that N ML training containers 630 are collectively training a machine learning model and that a particular ML training container 630 receiving the configuration information is ML training container 630 number X of N), which can be included in the resulting model data. By parallelizing the training process, the model training system 300 can significantly reduce the training time in some embodiments.

In some embodiments, a plurality of virtual machine instances 622 execute code 637 stored in a plurality of ML training containers 630. For example, the resources used to train a particular machine learning model can exceed the limitations of a single virtual machine instance 622. However, the algorithm included in the container image can be in a format that allows for the parallelization of the training process. Thus, the model training system 300 can create multiple copies of the container image provided in a training request, initialize multiple virtual machine instances 622, and cause each virtual machine instance 622 to load a container image copy in one or more separate ML training containers 630. The virtual machine instances 622 can then each execute the code 637 stored in the ML training containers 630 in parallel. The model training system 300 can further provide configuration information to each ML training container 630 via the virtual machine instances 622 (for example, information indicating that N ML training containers 630 are collectively training a machine learning model and that a particular ML training container 630 receiving the configuration information is ML training container 630 number X of N, information indicating that M virtual machine instances 622 are collectively training a machine learning model and that a particular ML training container 630 receiving the configuration information is initialized in virtual machine instance 622 number Y of M, etc.), which can be included in the resulting model data. As described above, by parallelizing the training process, the model training system 300 can significantly reduce the training time in some embodiments.

In some embodiments, the model training system 300 includes a plurality of physical computing devices and two or more of the physical computing devices hosts one or more virtual machine instances 622 that execute the code 637. Thus, the parallelization can occur over different physical computing devices in addition to over different virtual machine instances 622 and/or ML training containers 630.

In some embodiments, the model training system 300 includes a ML model evaluator 628. The ML model evaluator 628 can monitor virtual machine instances 622 as machine learning models are being trained, obtaining the generated model data and processing the obtained model data to generate model metrics. For example, the model metrics can include quality metrics, such as an error rate of the machine learning model being trained, a statistical distribution of the machine learning model being trained, a latency of the machine learning model being trained, a confidence level of the machine learning model being trained (for example, a level of confidence that the accuracy of the machine learning model being trained is known, etc. The ML model evaluator 628 can obtain the model data for a machine learning model being trained and evaluation data from the training data store 660. The evaluation data is separate from the data used to train a machine learning model and includes both input data and expected outputs (for example, known results), and thus the ML model evaluator 628 can define a machine learning model using the model data and execute the machine learning model by providing the input data as inputs to the machine learning model. The ML model evaluator 628 can then compare the outputs of the machine learning model to the expected outputs and determine one or more quality metrics of the machine learning model being trained based on the comparison (for example, the error rate can be a difference or distance between the machine learning model outputs and the expected outputs).

The ML model evaluator 628 periodically generates model metrics during the training process and stores the model metrics in the training metrics data store 665 in some embodiments. While the machine learning model is being trained, a user, via the user device 602, can access and retrieve the model metrics from the training metrics data store 665. The user can then use the model metrics to determine whether to adjust the training process and/or to stop the training process. For example, the model metrics can indicate that the machine learning model is performing poorly (for example, has an error rate above a threshold value, has a statistical distribution that is not an expected or desired distribution (for example, not a binomial distribution, a Poisson distribution, a geometric distribution, a normal distribution, Gaussian distribution, etc.), has an execution latency above a threshold value, has a confidence level below a threshold value)) and/or is performing progressively worse (for example, the quality metric continues to worsen over time). In response, in some embodiments, the user, via the user device 602, can transmit a request to the model training system 300 to modify the machine learning model being trained (for example, transmit a modification request). The request can include a new or modified container image, a new or modified algorithm, new or modified hyperparameter(s), and/or new or modified information describing the computing machine on which to train a machine learning model. The model training system 300 can modify the machine learning model accordingly. For example, the model training system 300 can cause the virtual machine instance 622 to optionally delete an existing ML training container 630, create and initialize a new ML training container 630 using some or all of the information included in the request, and execute the code 637 stored in the new ML training container 630 to restart the machine learning model training process. As another example, the model training system 300 can cause the virtual machine instance 622 to modify the execution of code stored in an existing ML training container 630 according to the data provided in the modification request. In some embodiments, the user, via the user device 602, can transmit a request to the model training system 300 to stop the machine learning model training process. The model training system 300 can then instruct the virtual machine instance 622 to delete the ML training container 630 and/or to delete any model data stored in the training model data store 675.

As described below, in some embodiments, the model data stored in the training model data store 675 is used by the model hosting system 140 to deploy machine learning models. Alternatively or additionally, a user device 602 or another computing device (not shown) can retrieve the model data from the training model data store 675 to implement a learning algorithm in an external device. As an illustrative example, a robotic device can include sensors to capture input data. A user device 602 can retrieve the model data from the training model data store 675 and store the model data in the robotic device. The model data defines a machine learning model. Thus, the robotic device can provide the captured input data as an input to the machine learning model, resulting in an output. The robotic device can then perform an action (for example, move forward, raise an arm, generate a sound, etc.) based on the resulting output.

While the virtual machine instances 622 are shown in FIG. 6 as a single grouping of virtual machine instances 622, some embodiments of the present application separate virtual machine instances 622 that are actively assigned to execute tasks from those virtual machine instances 622 that are not actively assigned to execute tasks. For example, those virtual machine instances 622 actively assigned to execute tasks are grouped into an "active pool," while those virtual machine instances 622 not actively assigned to execute tasks are placed within a "warming pool." In some embodiments, those virtual machine instances 622 within the warming pool can be pre-initialized with an operating system, language runtimes, and/or other software required to enable rapid execution of tasks (for example, rapid initialization of machine learning model training in ML training container(s) 630) in response to training requests.

In some embodiments, the model training system 300 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 602, the model hosting system 140, etc.). The processing unit can also communicate to and from a memory of a virtual machine instance 622 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the model hosting system 140 includes a single physical computing device or multiple physical computing devices that are interconnected using one or more computing networks (not shown), where the physical computing device(s) host one or more virtual machine instances 642. The model hosting system 140 can handle the acquisition and configuration of compute capacity (for example, containers, instances, etc.) based on demand for the execution of trained machine learning models. The model hosting system 140 can then execute machine learning models using the compute capacity, as is described in greater detail below. The model hosting system 140 can automatically scale up and down based on the volume of execution requests received from user devices 602 via frontend 649 of the model hosting system 140, thereby relieving the user from the burden of having to worry about over-utilization (for example, acquiring too little computing resources and suffering performance issues) or under-utilization (for example, acquiring more computing resources than necessary to run the machine learning models, and thus overpaying).

In some embodiments, the virtual machine instances 642 are utilized to execute tasks. For example, such tasks can include executing a machine learning model. As shown in FIG. 6, each virtual machine instance 642 includes an operating system (OS) 644, a language runtime 646, and one or more ML scoring containers 650. The ML scoring containers 650 are similar to the ML training containers 630 in that the ML scoring containers 650 are logical units created within a virtual machine instance using the resources available on that instance and can be utilized to isolate execution of a task from other processes (for example, task executions) occurring in the instance. In some embodiments, the ML scoring containers 650 are formed from one or more container images and a top container layer. Each container image further includes one or more image layers, where each image layer represents an executable instruction. As described above, some or all of the executable instructions together represent an algorithm that defines a machine learning model. Changes made to the ML scoring containers 650 (for example, creation of new files, modification of existing files, deletion of files, etc.) are stored in the top container layer. If a ML scoring container 650 is deleted, the top container layer is also deleted. However, the container image(s) that form a portion of the deleted ML scoring container 650 can remain unchanged. The ML scoring containers 650 can be implemented, for example, as Linux containers.

The ML scoring containers 650 each include a runtime 654, code 656, and dependencies 652 (for example, supporting software such as libraries) needed by the code 656 in some embodiments. The runtime 654 can be defined by one or more executable instructions that form at least a portion of a container image that is used to form the ML scoring container 650 (for example, the executable instruction(s) in the container image that define the operating system and/or runtime to run in the container formed from the container image). The code 656 includes one or more executable instructions that form at least a portion of a container image that is used to form the ML scoring container 650. For example, the code 656 includes the executable instructions in the container image that represent an algorithm that defines a machine learning model, which may reference dependencies 652. The code 656 can also include model data that represent characteristics of the defined machine learning model, as described in greater detail below. The runtime 654 is configured to execute the code 656 in response to an instruction to begin execution of a machine learning model. Execution of the code 656 results in the generation of outputs (for example, predicted results), as described in greater detail below.

In some embodiments, the runtime 654 is the same as the runtime 646 utilized by the virtual machine instance 642. In some embodiments, runtime 654 is different than the runtime 646 utilized by the virtual machine instance 642.

In some embodiments, the model hosting system 140 uses one or more container images included in a deployment request (or a container image retrieved from the container data store 670 in response to a received deployment request) to create and initialize a ML scoring container 650 in a virtual machine instance 642. For example, the model hosting system 140 creates a ML scoring container 650 that includes the container image(s) and/or a top container layer.

As described above, a user device 602 can submit a deployment request and/or an execution request to the model hosting system 140 via the frontend 649 in some embodiments. A deployment request causes the model hosting system 140 to deploy a trained machine learning model into a virtual machine instance 642. For example, the deployment request can include an identification of an endpoint (for example, an endpoint name, such as an HTTP endpoint name) and an identification of one or more trained machine learning models (for example, a location of one or more model data files stored in the training model data store 675). Optionally, the deployment request also includes an identification of one or more container images stored in the container data store 670.

Upon receiving the deployment request, the model hosting system 140 initializes ones or more ML scoring containers 650 in one or more hosted virtual machine instance 642. In embodiments in which the deployment request includes an identification of one or more container images, the model hosting system 140 forms the ML scoring container(s) 650 from the identified container image(s). For example, a container image identified in a deployment request can be the same container image used to form an ML training container 630 used to train the machine learning model corresponding to the deployment request. Thus, the code 656 of the ML scoring container(s) 650 includes one or more executable instructions in the container image(s) that represent an algorithm that defines a machine learning model. In embodiments in which the deployment request does not include an identification of a container image, the model hosting system 140 forms the ML scoring container(s) 650 from one or more container images stored in the container data store 670 that are appropriate for executing the identified trained machine learning model(s). For example, an appropriate container image can be a container image that includes executable instructions that represent an algorithm that defines the identified trained machine learning model(s).

The model hosting system 140 further forms the ML scoring container(s) 650 by retrieving model data corresponding to the identified trained machine learning model(s) in some embodiments. For example, the deployment request can identify a location of model data file(s) stored in the training model data store 675. In embodiments in which a single model data file is identified in the deployment request, the model hosting system 140 retrieves the identified model data file from the training model data store 675 and inserts the model data file into a single ML scoring container 650, which forms a portion of code 656. In some embodiments, the model data file is archived or compressed (for example, formed from a package of individual files). Thus, the model hosting system 140 unarchives or decompresses the model data file to obtain multiple individual files and inserts the individual files into the ML scoring container 650. In some embodiments, the model hosting system 140 stores the model data file in the same location as the location in which the model data file was stored in the ML training container 630 that generated the model data file. For example, the model data file initially was stored in the top container layer of the ML training container 630 at a certain offset, and the model hosting system 140 then stores the model data file in the top container layer of the ML scoring container 650 at the same offset.

In embodiments in which multiple model data files are identified in the deployment request, the model hosting system 140 retrieves the identified model data files from the training model data store 675. The model hosting system 140 can insert the model data files into the same ML scoring container 650, into different ML scoring containers 650 initialized in the same virtual machine instance 642, or into different ML scoring containers 650 initialized in different virtual machine instances 642. As an illustrative example, the deployment request can identify multiple model data files corresponding to different trained machine learning models because the trained machine learning models are related (for example, the output of one trained machine learning model is used as an input to another trained machine learning model). Thus, the user may desire to deploy multiple machine learning models to eventually receive a single output that relies on the outputs of multiple machine learning models.

In some embodiments, the model hosting system 140 associates the initialized ML scoring container(s) 650 with the endpoint identified in the deployment request. For example, each of the initialized ML scoring container(s) 650 can be associated with a network address. The model hosting system 140 can map the network address(es) to the identified endpoint, and the model hosting system 140 or another system (for example, a routing system, not shown) can store the mapping. Thus, a user device 602 can refer to trained machine learning model(s) stored in the ML scoring container(s) 650 using the endpoint. This allows for the network address of an ML scoring container 650 to change without causing the user operating the user device 602 to change the way in which the user refers to a trained machine learning model.

Once the ML scoring container(s) 650 are initialized, the ML scoring container(s) 650 are ready to execute trained machine learning model(s). In some embodiments, the user device 602 transmits an execution request to the model hosting system 140 via the frontend 649, where the execution request identifies an endpoint and includes an input to a machine learning model (for example, a set of input data). The model hosting system 140 or another system (for example, a routing system, not shown) can obtain the execution request, identify the ML scoring container(s) 650 corresponding to the identified endpoint, and route the input to the identified ML scoring container(s) 650.

In some embodiments, a virtual machine instance 642 executes the code 656 stored in an identified ML scoring container 650 in response to the model hosting system 140 receiving the execution request. In particular, execution of the code 656 causes the executable instructions in the code 656 corresponding to the algorithm to read the model data file stored in the ML scoring container 650, use the input included in the execution request as an input parameter, and generate a corresponding output. As an illustrative example, the algorithm can include coefficients, weights, layers, cluster centroids, and/or the like. The executable instructions in the code 656 corresponding to the algorithm can read the model data file to determine values for the coefficients, weights, layers, cluster centroids, and/or the like. The executable instructions can include input parameters, and the input included in the execution request can be supplied by the virtual machine instance 642 as the input parameters. With the machine learning model characteristics and the input parameters provided, execution of the executable instructions by the virtual machine instance 642 can be completed, resulting in an output.

In some embodiments, the virtual machine instance 642 stores the output in the model prediction data store 680. Alternatively or in addition, the virtual machine instance 642 transmits the output to the user device 602 that submitted the execution result via the frontend 649.

In some embodiments, the execution request corresponds to a group of related trained machine learning models. Thus, the ML scoring container 650 can transmit the output to a second ML scoring container 650 initialized in the same virtual machine instance 642 or in a different virtual machine instance 642. The virtual machine instance 642 that initialized the second ML scoring container 650 can then execute second code 656 stored in the second ML scoring container 650, providing the received output as an input parameter to the executable instructions in the second code 656. The second ML scoring container 650 further includes a model data file stored therein, which is read by the executable instructions in the second code 656 to determine values for the characteristics defining the machine learning model. Execution of the second code 656 results in a second output. The virtual machine instance 642 that initialized the second ML scoring container 650 can then transmit the second output to the model prediction data store 680 and/or the user device 602 via the frontend 649 (for example, if no more trained machine learning models are needed to generate an output) or transmit the second output to a third ML scoring container 650 initialized in the same or different virtual machine instance 642 (for example, if outputs from one or more additional trained machine learning models are needed), and the above-referenced process can be repeated with respect to the third ML scoring container 650.

While the virtual machine instances 642 are shown in FIG. 6 as a single grouping of virtual machine instances 642, some embodiments of the present application separate virtual machine instances 642 that are actively assigned to execute tasks from those virtual machine instances 642 that are not actively assigned to execute tasks. For example, those virtual machine instances 642 actively assigned to execute tasks are grouped into an "active pool," while those virtual machine instances 642 not actively assigned to execute tasks are placed within a "warming pool." In some embodiments, those virtual machine instances 642 within the warming pool can be pre-initialized with an operating system, language runtimes, and/or other software required to enable rapid execution of tasks (for example, rapid initialization of ML scoring container(s) 650, rapid execution of code 656 in ML scoring container(s), etc.) in response to deployment and/or execution requests.

In some embodiments, the model hosting system 140 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 602, the model training system 300, etc.). The processing unit can also communicate to and from a memory of a virtual machine instance 642 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the operating environment supports many different types of machine learning models, such as multi arm bandit models, reinforcement learning models, ensemble machine learning models, deep learning models, and/or the like.

The model training system 300 and the model hosting system 140 depicted in FIG. 6 are not meant to be limiting. For example, the model training system 300 and/or the model hosting system 140 could also operate within a computing environment having a fewer or greater number of devices than are illustrated in FIG. 6. Thus, the depiction of the model training system 300 and/or the model hosting system 140 in FIG. 6 may be taken as illustrative and not limiting to the present disclosure. For example, the model training system 300 and/or the model hosting system 140 or various constituents thereof could implement various web services components, hosted or "cloud" computing environments, and/or peer-to-peer network configurations to implement at least a portion of the processes described herein. In some embodiments, the model training system 300 and/or the model hosting system 140 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The frontend 629 processes all training requests received from user devices 602 and provisions virtual machine instances 622. In some embodiments, the frontend 629 serves as a front door to all the other services provided by the model training system 300. The frontend 629 processes the requests and makes sure that the requests are properly authorized. For example, the frontend 629 may determine whether the user associated with the training request is authorized to initiate the training process.

Similarly, frontend 649 processes all deployment and execution requests received from user devices 602 and provisions virtual machine instances 642. In some embodiments, the frontend 649 serves as a front door to all the other services provided by the model hosting system 140. The frontend 649 processes the requests and makes sure that the requests are properly authorized. For example, the frontend 649 may determine whether the user associated with a deployment request or an execution request is authorized to access the indicated model data and/or to execute the indicated machine learning model.

The training data store 660 stores training data and/or evaluation data. The training data can be data used to train machine learning models and evaluation data can be data used to evaluate the performance of machine learning models. In some embodiments, the training data and the evaluation data have common data. In some embodiments, the training data and the evaluation data do not have common data. In some embodiments, the training data includes input data and expected outputs. While the training data store 660 is depicted as being located external to the model training system 300 and the model hosting system 140, this is not meant to be limiting. For example, in some embodiments not shown, the training data store 660 is located internal to at least one of the model training system 300 or the model hosting system 140.

In some embodiments, the training metrics data store 665 stores model metrics. While the training metrics data store 665 is depicted as being located external to the model training system 300 and the model hosting system 140, this is not meant to be limiting. For example, in some embodiments not shown, the training metrics data store 665 is located internal to at least one of the model training system 300 or the model hosting system 140.

The container data store 670 stores container images, such as container images used to form ML training containers 630 and/or ML scoring containers 650, that can be retrieved by various virtual machine instances 622 and/or 642. While the container data store 670 is depicted as being located external to the model training system 300 and the model hosting system 140, this is not meant to be limiting. For example, in some embodiments not shown, the container data store 670 is located internal to at least one of the model training system 300 and the model hosting system 140.

The training model data store 675 stores model data files. In some embodiments, some of the model data files are comprised of a single file, while other model data files are packages of multiple individual files. While the training model data store 675 is depicted as being located external to the model training system 300 and the model hosting system 140, this is not meant to be limiting. For example, in some embodiments not shown, the training model data store 675 is located internal to at least one of the model training system 300 or the model hosting system 140.

The model prediction data store 680 stores outputs (for example, execution results) generated by the ML scoring containers 650 in some embodiments. While the model prediction data store 680 is depicted as being located external to the model training system 300 and the model hosting system 140, this is not meant to be limiting. For example, in some embodiments not shown, the model prediction data store 680 is located internal to at least one of the model training system 300 and the model hosting system 140.

While the model training system 300, the model hosting system 140, the training data store 660, the training metrics data store 665, the container data store 670, the training model data store 675, and the model prediction data store 680 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (for example, also referred to herein as a machine learning service) can communicate with one or more of the user devices 602 via the one or more network(s) 106.

Various example user devices 602 are shown in FIG. 6, including a desktop computer, laptop, and a mobile phone, each provided by way of illustration. In general, the user devices 602 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, the model training system 300 and/or the model hosting system 140 provides the user devices 602 with one or more user interfaces, command-line interfaces (CLI), application programming interfaces (API), and/or other programmatic interfaces for submitting training requests, deployment requests, and/or execution requests. In some embodiments, the user devices 602 can execute a stand-alone application that interacts with the model training system 300 and/or the model hosting system 140 for submitting training requests, deployment requests, and/or execution requests.

In some embodiments, the network 106 includes any wired network, wireless network, or combination thereof. For example, the network 106 may be a personal area network, local area network, wide area network, over-the-air broadcast network (for example, for radio or television), cable network, satellite network, cellular telephone network, or combination thereof. As a further example, the network 106 may be a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks. For example, the protocols used by the network 106 may include HTTP, HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 7:
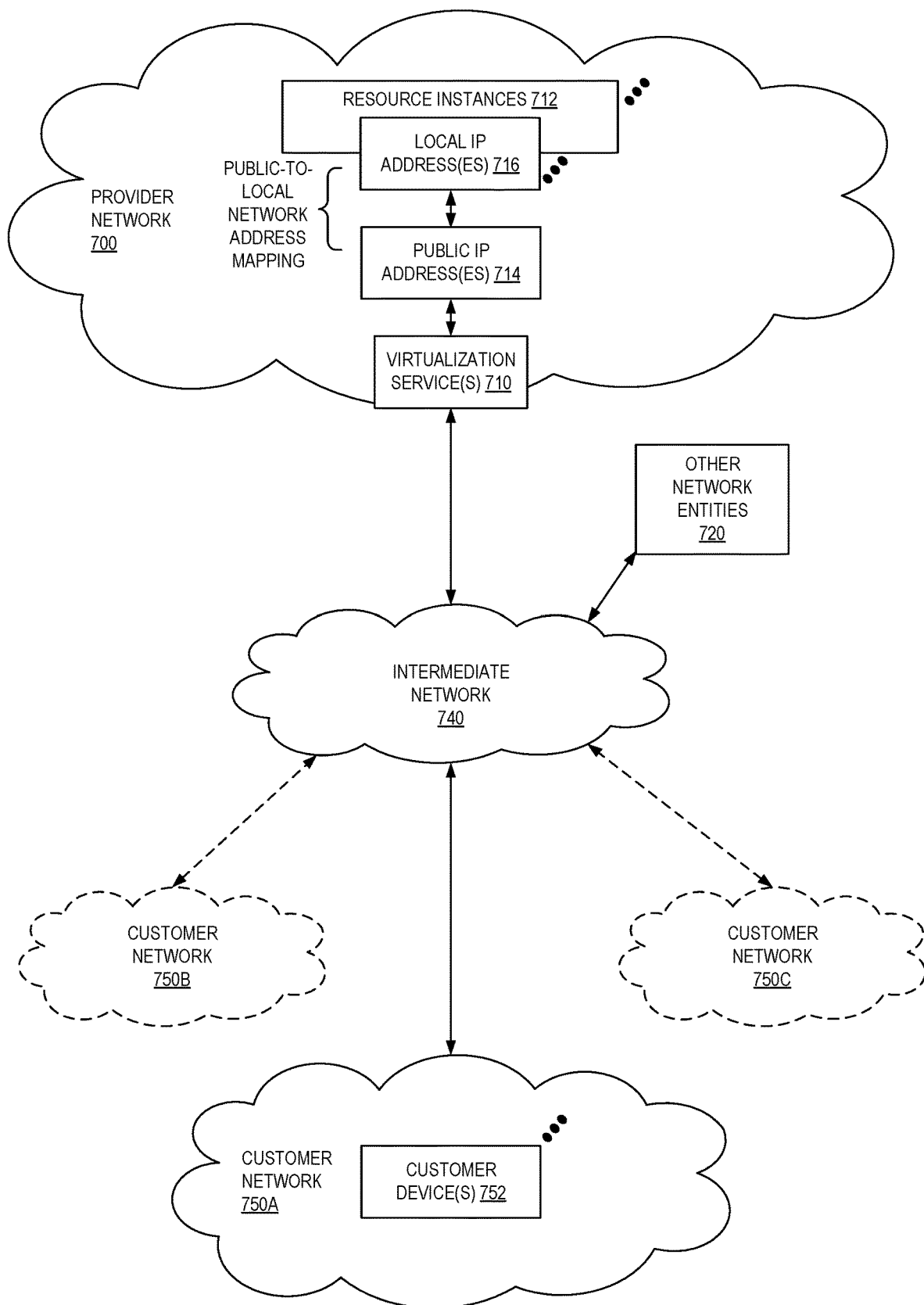
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
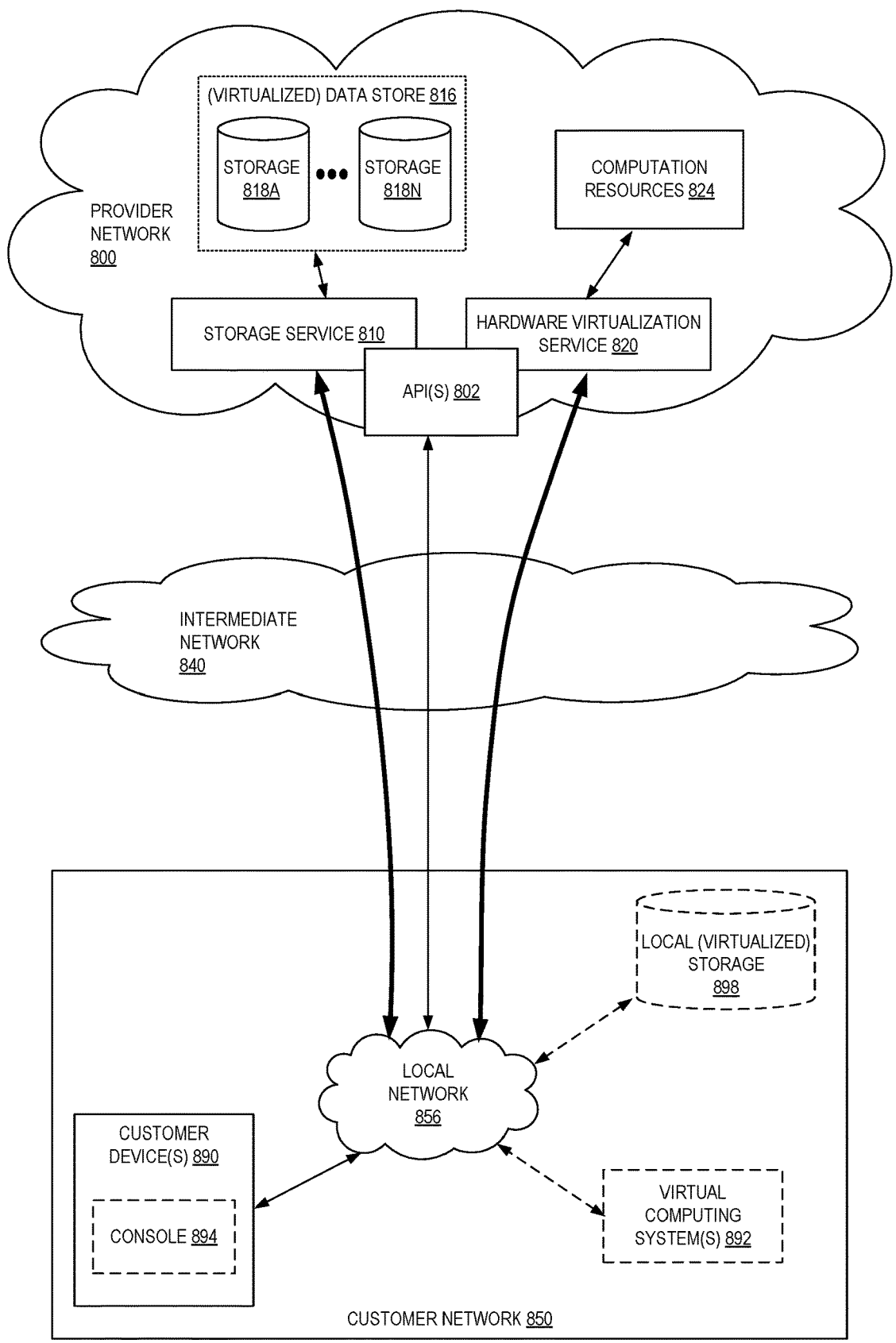
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative Systems

Figure 9:
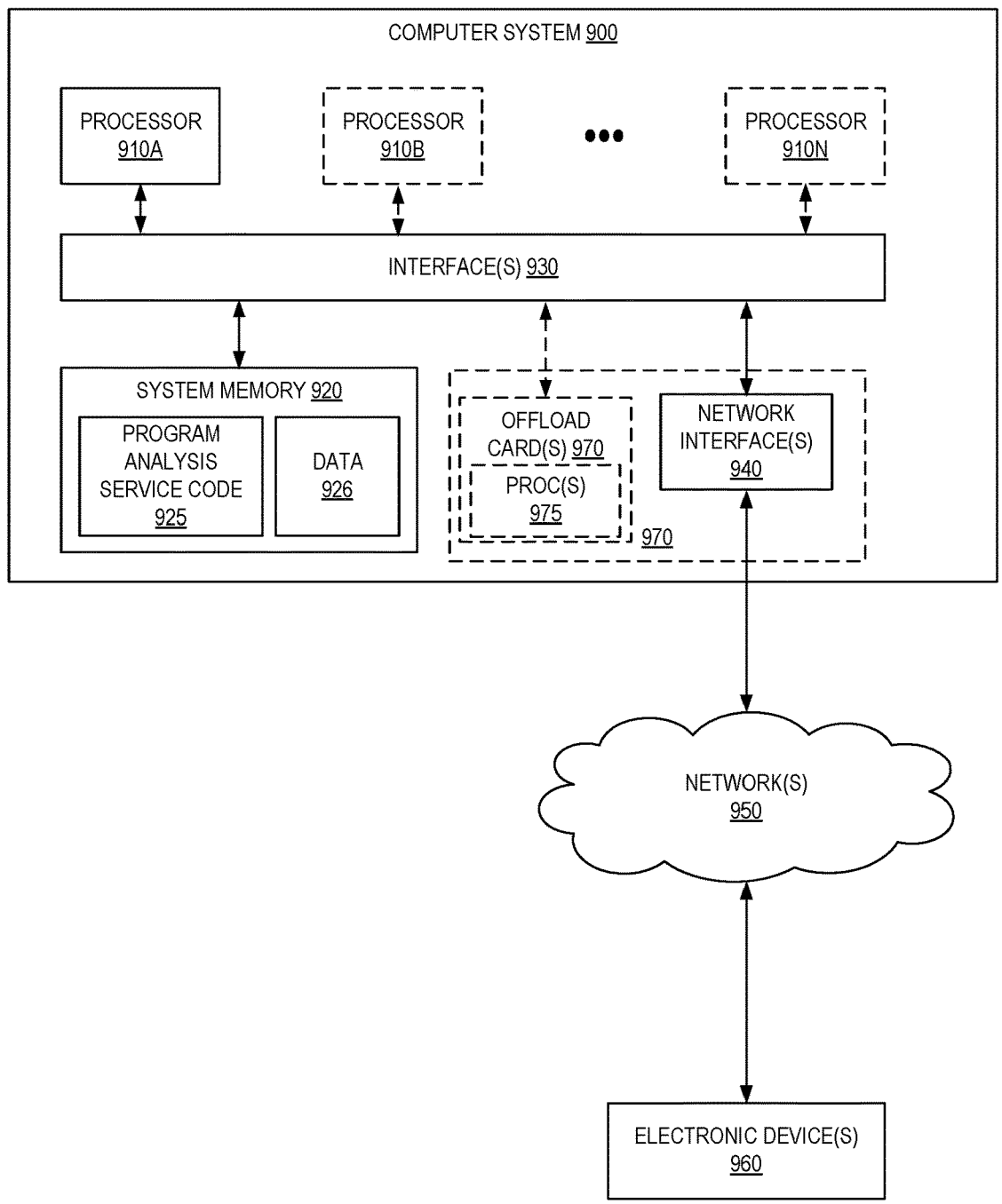
FIG. 9 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as program analysis service code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
obtaining training code from one or more public code repositories;
determining a correct portion of the training code based at least on a program analysis, the correct portion of the training code associated with no errors detected by the program analysis;
identifying a pattern in the correct portion of the training code associated with a resource leak, the pattern occurring in a plurality of locations in the correct portion of the training code;
synthetically generating labeled data by deleting close resource calls in the plurality of locations in the correct portion of the training code; and
sending a request to a machine learning service to train a resource leak detection model using at least the synthetically generated labeled data and an incorrect portion of the training code, the incorrect portion of the training code identified as including one or more errors by the program analysis, wherein the machine learning service stores the trained resource leak detection model to an endpoint of the machine learning service.

2. The computer-implemented method of claim 1, further comprising:
receiving a request to perform program analysis on customer code;
determining a first portion of the customer code includes one or more resource leaks;
sending the first portion of the customer code to the endpoint of the machine learning service; and
receiving inference results from the resource leak detection model identifying one or more resource leaks in the first portion of the code.

3. The computer-implemented method of claim 2, further comprising:
returning program analysis results to the customer, the program analysis results including highlighted portions of the customer code corresponding to the one or more resource leaks.

4. A computer-implemented method comprising:
receiving a request to perform program analysis on code;
determining a first portion of the code associated with a first error type;
sending the first portion of the code to an endpoint of a machine learning service associated with an error detection model to detect the first error type, the error detection model trained using synthetically generated labeled data;
wherein the synthetically generated labeled data is generated based on mutating a correct portion of training code to include a plurality of errors of the first error type; and
receiving inference results from the error detection model identifying one or more errors of the first error type in the first portion of the code.

5. The computer-implemented method of claim 4, further comprising:

obtaining the training code from one or more code repositories; and
storing the synthetically generated labeled data in a training data store.

6. The computer-implemented method of claim 5, wherein generating training data by mutating the correct portion of the training code to include a plurality of errors of the first error type, further comprising:
identifying a pattern in the correct portion of the training code associated with the first error type, the pattern occurring in a plurality of locations in the correct portion of the training code; and
generating the synthetically generated labeled data by deleting a portion of code corresponding to a portion of the pattern in the plurality of locations in the correct portion of the training code.

7. The computer-implemented method of claim 6, further comprising:
sending a request to the machine learning service to train the error detection model using the training data, wherein the machine learning service obtains the training data from the training data store and trains the error detection model using the training data and a machine learning training algorithm.

8. The computer-implemented method of claim 7, wherein the machine learning training algorithm includes a positive unlabeled learning algorithm or a supervised learning algorithm.

9. The computer-implemented method of claim 8, wherein upon training the error detection model, the machine learning service stores the error detection model to the endpoint of the machine learning service.

10. The computer-implemented method of claim 4, further comprising:
sending the first portion of the code to a plurality of endpoints of the machine learning service in parallel, each endpoint associated with a different error detection model to detect a plurality of error types, each error detection model trained using synthetically generated labeled data.

11. The computer-implemented method of claim 4, further comprising:
returning program analysis results, the program analysis results including highlighted portions of the code corresponding to the one or more errors of the first error type.

12. The computer-implemented method of claim 11, wherein the first error type corresponds to a resource leak.

13. A system comprising:
a first one or more electronic devices comprising one or more processors to implement a machine learning service; and
a second one or more electronic devices comprising one or more processors to implement a program analysis service, the program analysis service including instructions that upon execution cause the program analysis service to:
receive a request to perform program analysis on code;
determine a first portion of the code associated with a first error type;
send the first portion of the code to an endpoint of the machine learning service associated with an error detection model to detect the first error type, wherein the error detection model is trained using synthetically generated labeled data, and wherein the synthetically generated labeled data is generated based on mutating a correct portion of training code to include a plurality of errors of the first error type; and receive inference results from the error detection model identifying one or more errors of the first error type in the first portion of the code.

14. The system of claim 13, wherein the instructions, upon execution, further cause the program analysis service to:

obtain the training code from one or more code repositories; and store the synthetically generated labeled data in a training data store.

15. The system of claim 14, wherein to generate training data by mutating the correct portion of the training code to include a plurality of errors of the first error type, the instructions, upon execution, further cause the program analysis service to:

identify a pattern in the correct portion of the training code associated with the first error type, the pattern occurring in a plurality of locations in the correct portion of the training code; and generate the synthetically generated labeled data by deleting a portion of code corresponding to a portion of the pattern in the plurality of locations in the correct portion of the training code.

16. The system of claim 15, wherein the instructions, upon execution, further cause the program analysis service to send a request to the machine learning service to train the error detection model using the training data, wherein the machine learning service obtains the training data from the training data store and trains the error detection model using the training data and a machine learning training algorithm.

17. The system of claim 16, wherein the machine learning training algorithm includes a positive unlabeled learning algorithm or a supervised learning algorithm.

18. The system of claim 17, wherein upon training the error detection model, the machine learning service stores the error detection model to the endpoint of the machine learning service.

19. The system of claim 13, wherein the instructions, upon execution, further cause the program analysis service to:

send the first portion of the code to a plurality of endpoints of the machine learning service in parallel, each endpoint associated with a different error detection model to detect a plurality of error types, each error detection model trained using synthetically generated labeled data.

20. The system of claim 13, wherein the instructions, upon execution, further cause the program analysis service to:

return program analysis results, the program analysis results including highlighted portions of the code corresponding to the one or more errors of the first error type.

* * * * *